United States Patent Office 3,424,552
Patented Jan. 28, 1969

---

3,424,552
PROCESS FOR PRODUCTION OF MERCURIC CHLORIDE AND RED OXIDE OF MERCURY
Eugene L. Cadmus, Glen Ridge, N.J., assignor to Wood-Ridge Chemical Corporation, Wood-Ridge, N.J., a corporation of Nevada
No Drawing. Filed Apr. 5, 1967, Ser. No. 628,533
U.S. Cl. 23—87                10 Claims
Int. Cl. C01g 13/04

ABSTRACT OF THE DISCLOSURE

In the process for the production of mercuric chloride by reacting chlorine and mercury, the improvement wherein chlorine is reacted with mercury dispersed in sodium chloride brine. A process for the production of red oxide of mercury in which the reaction product of the chlorination of mercury dispersed in sodium chloride brine is added with caustic soda to an agitated sodium chloride brine having an alkalinity maintained at from about 0.01 N to about 1.25 N.

---

Mercuric chloride, a well known and useful chemical, is commonly prepared by charging mercury and gaseous chlorine to gas-fired retorts. The product is recovered overhead where it sublimes into crystals in a lead chamber at a controlled temperature. Precipitation of the mercuric chloride in this manner, hereinafter referred to as the dry process, requires long periods of time, for example 24 hours to produce about 800 lbs., and large retorts and chambers. Although a process for producing mercuric chloride by passing chlorine into a vessel containing mercury and water has been known since 1810, processes of this type, hereinafter referred to as wet processes, have not been commercially practical. Hence, there is a need for an improved wet process for the production of mercuric chloride which is commercially practical and eliminates the time, space and fuel requirements of the dry process.

One use of mercuric chloride is in the production of the oxides of mercury. Yellow oxide of mercury can be prepared by adding excess caustic soda to a strong solution of mercuric chloride in brine. While red oxide of mercury can also be prepared from mercuric chloride, heretofore it could not be prepared using caustic soda. There exists a present need for a process by which red oxide of mercury can be prepared from metallic mercury using caustic soda.

Therefore, it is one object of the present invention to provide an improved and commercially practical wet process for the production of mercuric chloride from chlorine and mercury.

Another object of the present invention is to provide a process for the production of mercuric chloride which provides a substantial reduction in the time, space and fuel consumption required in the presently used gas-fired retort process.

Another object of the present invention is to provide a process for the production of red oxide of mercury starting with metallic mercury, chlorine and caustic soda.

Still another object of this invention is to provide a process for the production of red oxide of mercury from a solution of crude mercuric chloride and caustic soda wherein the particle size and density of the product can be readily controlled.

These and other objects of the present invention will be apparent from the ensuing description.

The process of the present invention comprises reacting chlorine with mercury dispersed in sodium chloride brine, the brine containing at least about 10% sodium chloride. It is surprising and unexpected that the process of the present invention should be a practical and economical method for the production of mercuric chloride since, although the reaction of mercury to mercuric chloride by passing chlorine through a solution of mercury-in-water has been known since 1810, it has not been a commercially practical process. The reaction rate of the prior wet process was too slow and the yield too small to be of any practical value.

It has now been discovered that by dispersing mercury metal in sodium chloride brine and passing chlorine gas therethrough, mercuric chloride is obtained in excellent yield. This surprising effect is not readily noticeable at brine concentrations of less than about 10% sodium chloride and hence, lower concentrations are not practical. Moreover, it is preferred that the brine contains from about 10% sodium chloride, and even more preferably from about 15%, to up to the amount of sodium chloride required for a saturated solution at the operating temperature. Higher concentrations can be used but the presence of undissolved sodium chloride is generally undesirable as it interferes in further processing of the reaction mixture and in the separation of the unreacted mercury therefrom. The process can be operated most economically at a brine concentration of from about 20% to about 26% sodium chloride.

The concentration of mercury in the brine is not critical and amounts of mercury from about 1 to about 4 parts mercury to about 5 parts of brine have been found to be satisfactory.

It is also preferred to maintain the reaction mixture and chlorine gas reactant at a pressure above atmospheric pressure and pressures of from about one inch of water to about one pound per square inch are sufficient although higher pressures can be used with equal success. A satisfactory operating pressure can be obtained by adding the chlorine under pressure to a closed vessel.

While the process can be performed at room temperature or higher, it is further preferred to maintain the temperature of the reaction mixture at from about 20° C. to about 100° C. and most preferably at a temperature of from about 50° C. to about 90° C. since the reaction is slower at lower temperatures.

The process can be performed on a batch basis or can be performed continuously. In either case the chlorine gas is preferably bubbled through the brine at the desired pressure above atmospheric and most preferably is finely dispersed in small bubbles for maximum contact in passing through the brine.

Upon reaction to the desired concentration of mercuric chloride, which is not critical and conveniently can be from a few parts by weight to up to about 1,000 parts mercuric chloride per about 2500 parts reaction mixture or higher, the reaction mixture can be separated from any mercury dispersed therein by various means, such as by filtration through a suitable filter medium, for example fritted or sintered porous glass. The reaction mixture can be further treated or purified to isolate crude and/or purified mercuric chloride or can be used as is to produce red oxide of mercury as will be hereinafter described.

As a specific embodiment of this invention it has now been found that the reaction product, and particularly the reaction mixture, containing mercuric chloride, obtained from the process described above can be reacted with caustic soda by addition to an agitated sodium chloride brine to form red oxide of mercury. This is surprising since it was heretofore known that yellow oxide of mercury was the product formed upon treatment of mercuric chloride with caustic soda.

In this embodiment, the reaction product from the above process and aqueous caustic soda solution, are added to sodium chloride brine. It is necessary to maintain the alkalinity of the resulting reaction mixture within the range of from about 0.1 to about 1.25 normality (N). The alkalinity of the reaction mixture is preferably maintained between about 0.1 and about 0.6 N, and most preferably between about 0.2 and about 0.5 N. The maintenance of the alkalinity can be accomplished by simultaneous addition of the reactants, or an equivalent thereof, and particularly by controlling the proportions of the reaction product from the chlorination step and the caustic soda, and the rate of addition of these ingredients within close limits. Furthermore, a temperature of from about 50° C. to about 125° C. is required in this embodiment, and a temperature of from about 80° C. to about 125° C. is preferred, while a temperature of from about 95° C. to about 110° C. is most preferred. It has been found that the presence of substantial quantities of sodium chloride in the brine, maintenance of the alkalinity of the brine within the said normality range, and operation at temperatures within the stated range influence the reaction to produce red oxide of mercury rather than yellow oxide of mercury.

The rate of simultaneous addition of the caustic soda and the reaction product from the mercury chlorination must be held constant in order to yield a product having a substantially homogeneous particle size and density. Generally, an increase in the rate of addition, decreases both the particle size and the density. The addition rate must be selected so as to maintain the alkalinity of the reaction mixture within the above limits at the selected concentration of the ingredients. Within these limits, the addition rate can be varied to obtain a product of desired particle size and density.

It has been found that at least 24 parts by weight of sodium hydroxide in the caustic soda solution per 100 parts by weight of mercuric chloride in the chlorination step reaction mixture is desirable to maintain the solution at an alkalinity within the above limits, and to afford complete conversion. The use of less than this amount raises the acidity of the reaction mixture to a normality substantially below 0.1 N in base, resulting in incomplete conversion and contamination of the product with chlorine containing compounds. It is preferred to utilize a quantity of sodium hydroxide in excess of 24 parts by weight per 100 parts of mercuric chloride for rapid conversion and maximum yields. However, large excesses of sodium hydroxide, for example, above about 60 parts by weight sodium hydroxide per 100 parts by weight mercuric chloride should not be used, as the reaction mixture would be too alkaline, i.e. above about 1.25 N, forming the yellow oxide of mercury rather than the desired red oxide of mercury.

In this embodiment the sodium chloride brine can be a solution or alternatively can be a slurry containing only a minimal quantity of water. While the exact proportion of sodium chloride in the brine in this embodiment is not critical, it has been found that at least 35 parts by weight of sodium chloride per 100 parts of mercuric chloride are required for conversion to a red oxide of mercury product having a particle size of about 7 to about 40 microns and density in the range of about 20 to about 80 grams per cubic inch. Increased amounts of sodium chloride can be used to obtain a red oxide product having a larger particle size and a greater density.

As a further embodiment of this invention the sodium chloride brine in the above embodiment can also contain a minor proportion of sodium carbonate. The inclusion of a minor proportion of sodium carbonate in the said mixture assists in the control of the alkalinity of the reaction mixture and the density of the product. Only minor amounts are required, for example, amounts in the order of 1 to 10 parts by weight sodium carbonate per 100 parts by weight mercuric chloride have been found to be effective in controlling the density of the product.

After the conversion is complete, the red oxide of mercury, having precipitated during the intimate mixing, can be separated from the soluble by-products and unreacted materials by decantation. The red oxide of mercury thus obtained has many uses as such or can be washed, filtered and dried to yield the commercially desirable product.

As one of the many advantages of the process for preparing red oxide of mercury as described above, very little mercury, in the order of 5 parts per million or less, will appear in the by-products, filtrate, and wash water when excess caustic soda and sodium chloride are used as described herein, and the mixture and wash water are kept at least slightly alkaline throughout the decantation and purification procedures. The small amount of mercury in the supernatant liquid and wash water permit their safe and inexpensive disposal and thereby provide an advantage over other processes which produce waste streams containing large amounts of highly toxic soluble mercury compounds.

The process of the present invention and the control of the physical properties by adjustment of the process variables will be more readily understood from the following examples, which are presented to illustrate the invention, but not to restrict the invention thereto.

Example 1.—Preparation of mercuric chloride

An aqueous solution of sodium chloride (1000 ml. containing 26% sodium chloride) and mercury (200 grams) were placed into a two-liter, five-necked, glass reactor having a tubular, stop cocked bottom outlet, a medium fritted porous glass plate about one inch from the bottom and equipped with a mechanical stirrer and an internal thermometer. The reactor was fitted with two metering pumps attached to necks of the reactor to deliver mercury and brine and a third pump was attached to a neck of the reactor to withdraw solution from the reactor through a fritted glass tube. A positive pressure of a maximum of 10 inches of water was maintained on the reactor by means of a glass tube leading from one of the necks of the reactor to a graduated cylinder containing water. Chlorine gas was introduced continuously through the bottom outlet of the reactor and dispersed into the stirred reactor charge by the porous plate. After four hours the temperature of the reaction mixture had increased from 23° C. to 85° C. during which time additional mercury (800 grams) was added to the reactor through one of the metering pumps at a rate of 200 grams per hour. The reaction mixture was found to contain 995 grams of mercuric chloride per liter of reaction mixture at the end of the four hour period.

Example 2.—Preparation of mercuric chloride

The preparation in Example 1 was continued on a continuous basis adding mercury at a rate of about 300 ml. per hour and 26% aqueous sodium chloride solution at a rate of about 300 ml. per hour to the stirred reaction mixture while continuously introducing chlorine at a reaction mixture temperature of about 85° C. and withdrawing reaction mixture at a rate of about 300 ml. per hour. After three additional hours of continuous operation, reaction mixture (2788 ml.) containing mercuric chloride (785 grams) had been removed from the reactor, and the reactor contained reaction mixture (1200 ml.)

containing mercuric chloride (1052 grams per liter of reaction mixture).

Example 3.—Preparation of mercuric chloride

Mercury (100 grams) and 26% aqueous sodium chloride solution (450 ml.) were charged to the apparatus described in Example 1. Chlorine gas was continuously introduced to the reaction mixture and dispersed by the porous plate. Additional mercury was added to the reactor, the temperature of the reaction mixture measured, the concentration of mercuric chloride in the reaction mixture determined, and the percent mercury reacted calculated according to the following schedule:

| Reaction time, hours | Reaction temp., degrees, C. | Add'l mercury added, grams | Concentration Hg Cl$_2$, g./l. | Percent mercury reacted |
|---|---|---|---|---|
| 0 | 21 | | | |
| 1 | 24 | | 40 | 13 |
| 2 | 32 | 100 | 135 | 22 |
| 3 | 37 | 50 | 240 | 31.2 |
| 5 | 44 | | 555 | 72.2 |
| 5.75 | 44 | | 637 | 82.1 |

Example 4.—Preparation of mercuric chloride

Mercury (100 grams) and 13% aqueous sodium chloride solution (540 ml.) were charged to the apparatus described in Example 1. Chlorine gas was continuously introduced into the reaction mixture through the bottom outlet and dispersed by the porous plate. Additional mercury was added to the reaction, the temperature of the reaction mixture measured, the concentration of mercuric chloride in the reaction mixture determined, and the percent mercury reacted calculated according to the following schedule:

| Reaction time, hours | Reaction temp., degrees, C. | Add'l mercury added, grams | Concentration Hg Cl$_2$, g./l. | Percent mercury reacted |
|---|---|---|---|---|
| 0 | 20 | | | |
| 1 | 26 | | 40 | 13 |
| 2 | 29 | 50 | 150 | 18 |
| 5.25 | 32 | | 170 | 42.5 |
| 5.75 | 34 | | 198 | 55.4 |

Example 5.—Preparation of red oxide of mercury

A 26% (saturated) aqueous sodium chloride solution (300 ml.) containing sufficient sodium hydroxide so that the alkalinity of the solution was 0.25 N (in base) was charged to a 2-liter, jacketed, 5-necked flask with a bottom outlet. This bottom outlet was fitted with a rising-stem plug valve. The center neck was fitted with an agitator; 2 side necks allowed the metered delivery of Hg Cl$_2$ solution and NaOH solution. The brine in the reactor was heated to 100° C. and continuously stirred. A solution of the filtered reaction mixture of Example 1 (200 ml. containing 1,000 grams of mercuric chloride per liter of solution), hereinafter referred to as Solution A, in a 26% aqueous sodium chloride solution and an aqueous sodium hydroxide solution (242 ml. containing 20% by weight sodium hydroxide and sodium chloride, 244 grams per liter of solution), hereinafter referred to as Solution B, were added simultaneously to the stirred brine in the reactor at rates of 2 ml. per minute and 2.41 ml. per minute, respectively. After the addition was completed, the reaction mixture was filtered and the precipitated red oxide of mercury was washed with water and dried. The red oxide of mercury thus produced had an average particle size of 38 microns, an average density of 89.5 grams per cubic inch, and assayed 99.83% mercuric oxide.

The filtrate contained 2.5 grams of mercury and had an alkalinity of 0.18 N based on sodium hydroxide. If desired, the filtrate can be used, after neutralization with an acid such as hydrochloric acid, as the sodium chloride brine in the chlorination of mercury step.

The preparation of red oxide of mercury similar to that described above was repeated varying the addition rates with the following effect on the particle size and density of the red oxide of mercury produced.

| Addition rate (ml./minute) | | Particle size (microns) | Density (gms./cubic inch) |
|---|---|---|---|
| Solution A [1] | Solution B [1] | | |
| 2 | 2.4 | 38 | 89.5 |
| 6.6 | 8 | 40 | 79.3 |
| 15 | 18 | 33 | 69.2 |

[1] Solution A and Solution B defined above.

The preparation of red oxide of mercury similar to that described above was also repeated varying the alkalinity of the sodium chloride brine with the following effect on the particle size and density of the red oxide of mercury produced:

| Alkalinity of sodium chloride brine (normality, in base) | Particle size (microns) | Density (gms./cubic inch) |
|---|---|---|
| 0.10 | 42 | 90.1 |
| 0.25 | 38 | 89.5 |
| 0.75 | 16.5 | 59.5 |
| 1.25 | 12.5 | 49.4 |

Example 6.—Preparation of red oxide of mercury

A 26% aqueous sodium chloride solution (350 ml.) containing sufficient sodium hydroxide so that the alkalinity of the solution was 0.25 N (in base) was charged to the apparatus described in the previous example. The brine in the reactor was heated to 100° C. and continuously stirred. A solution of the filtered reaction mixture of Example 1 containing 1000 grams mercuric chloride per liter and an aqueous solution of sodium hydroxide containing 244 grams sodium hydroxide per liter were added simultaneously to the stirred brine in the reactor at rates of 6.6 ml. per minute and 8 ml. per minute, respectively. After the first ½ hour, approximately 0.35 grams red oxide of mercury per ml. of reaction mixture were taken at each five minute intervals for 1½ hours, yielding 247 grams of red oxide of mercury having a particle size of 44 microns and a density of 72.7 grams per cubic inch. The stirring was continued for ½ hour without further addition of materials, and the sodium hydroxide solution (16 ml.), described above, added to increase the alkalinity of the sodium chloride brine. The addition of the solutions was continued and product removed at 10 minute intervals for one hour. At the end of this period, the reactor was emptied of reaction mixture which was filtered. The recovered precipitated solid was washed with water and dried to recover 203 grams of red oxide of mercury assaying 99.96% red oxide of mercury and having a particle size of 39 microns and a density of 81.6 grams per cubic inch. The operation yielded a total of 979 grams of red oxide of mercury having an average particle size of 41 microns and an average density of 76.6 grams per cubic inch.

I claim:

1. In the process for the production of mercuric chloride by reacting chlorine and mercury, the improvement which comprises reacting the chlorine with mercury dispersed in sodium chloride brine containing at least about 10% sodium chloride.

2. The improvement of claim 1 wherein the reaction system is substantially free of undissolved sodium chloride.

3. The improvement of claim 2 wherein the chlorine and mercury in sodium chloride brine are maintained at a pressure above atmospheric pressure.

4. The improvement of claim 1 wherein the brine is maintained at a temperature of from about 20° to about 100° C.

5. The improvement of claim 1 wherein the brine contains at least about 15% sodium chloride and chlorine gas is bubbled through the brine at a pressure above atmospheric pressure.

6. The improvement of claim 5 wherein the brine contains from about 20% to about 26% sodium chloride.

7. The improvement of claim 1 wherein the brine contains from about 1 part to about 4 parts of mercury per about 5 parts of brine.

8. A process for the production of red oxide of mercury which comprises adding the reaction product of the process of claim 1 and caustic soda to an agitating sodium chloride brine at a temperature of from about 50° C. to about 125° C. while maintaining the alkalinity of the brine at from about 0.01 to about 1.25 N.

9. The process of claim 8 wherein the alkalinity of the brine is maintained at from about 0.01 to about 0.6 N and wherein the temperature is from about 95° C. to about 110° C.

10. The process of claim 9 wherein the brine contains at least 35 parts by weight of sodium chloride per 100 parts by weight of mercuric chloride in the reaction mixture.

References Cited

UNITED STATES PATENTS

| | | | |
|---|---|---|---|
| 1,373,357 | 3/1921 | Schantz | 23—87 |
| 3,083,079 | 3/1963 | Calkins et al. | 23—87 |
| 3,149,917 | 9/1964 | Cadmus et al. | 23—183 |

EDWARD STERN, *Primary Examiner*.

U.S. Cl. X.R.

23—183